United States Patent [19]

Monteleone

[11] Patent Number: 4,965,431

[45] Date of Patent: Oct. 23, 1990

[54] SWEEP WELDING METHOD AND APPARATUS THEREFOR

[75] Inventor: John Monteleone, Jamestown, N.Y.

[73] Assignee: Blackstone Corporation, Jamestown, N.Y.

[21] Appl. No.: 397,102

[22] Filed: Aug. 21, 1989

[51] Int. Cl.⁵ .............................................. B23K 9/08
[52] U.S. Cl. ................................. 219/123; 219/60.2; 219/125.1
[58] Field of Search .................... 219/123, 60.2, 125.1, 219/125.11

[56] References Cited

U.S. PATENT DOCUMENTS

| | | | |
|---|---|---|---|
| 2,743,342 | 4/1956 | Bettis et al. | 219/123 |
| 3,626,145 | 12/1971 | Jackson | 219/123 |
| 3,675,841 | 7/1972 | Gutlhuber et al. | 228/25 |
| 4,246,464 | 1/1981 | Altstetter et al. | 219/123 |
| 4,278,868 | 7/1981 | Rudd et al. | 219/123 |
| 4,303,823 | 12/1981 | Stine | 219/125.1 |
| 4,319,113 | 3/1982 | Glatthorn et al. | 219/60.2 |
| 4,376,886 | 3/1983 | Sciaky et al. | 219/121 ED |
| 4,425,491 | 1/1984 | Batistoni et al. | 219/60.2 |
| 4,443,686 | 4/1984 | Pache et al. | 219/123 |
| 4,511,784 | 4/1985 | Miyamori et al. | 219/123 |
| 4,529,034 | 7/1985 | Saperstein | 165/134 R |
| 4,744,505 | 5/1988 | Calleson | 228/175 |

OTHER PUBLICATIONS

Cyclomatic Industries Inc., Users Manual, 1037–0141 Magnetic Arc Controls, Feb. 188, Revision B.

*Primary Examiner*—Clifford C. Shaw
*Attorney, Agent, or Firm*—St. Onge, Steward, Johnston & Reens

[57] ABSTRACT

A method and apparatus for welding a tube to a tube plate such as in a vehicular radiator core are provided wherein a tube end formed by a tube end sidewall protrudes through an aperture in the plate to provide a joint for welding the sidewall to the plate in the region of the aperture. A welding arc is moved in a selected direction along a path of travel to form a weldment along the joint where the arc encounters the joint, while simultaneously reciprocating the arc back and forth in a crossways direction relative to the selected direction with an amplitude of reciprocation sufficient to encounter at least a portion of the joint lying to at least one side of the path to further form a weldment along the joint portion as the arc moves in the selected direction.

46 Claims, 5 Drawing Sheets

SWEEP WELDING METHOD AND APPARATUS THEREFOR

I. FIELD OF THE INVENTION

The present invention relates to the welding of heat exchanger tubes to a header in a device such as a vehicular radiator core. More specifically, an apparatus and a method is provided for sweep welding a row of tube ends protruding through apertures in the header to thereby weld the tube ends to the header all the way around the tube end.

II. BACKGROUND OF THE INVENTION

It is known in the prior art to use electric arc welding to weld radiator core tubes to a header, which header has apertures for engaging tube ends that protrude therethrough.

In the prior art, the welding apparatus traces around the entire perimeter of a generally oval welding joint formed by protruding an oval shaped tube end through an aperture in the header. The tube ends form a generally rectangular array of oval welding joints, and the prior art welding apparatus under various combinations of automated control and manual intervention positions the tip of the welding head at a starting point on the oval, strikes an arc, and then traces a circuit all the way around the oval tube end to complete the weld. The welding head is then moved on to the next oval and the cycle is repeated. It is typical to carry out the welding process in a tungsten inert gas (TIG) environment.

Such prior art trace welding can be a problem in that porous and therefore weak welds prone to leakage can result therefrom. Cartridge brass, which is about 70% copper and 30% zinc, is typically used to form both the header and the tubes. Because the welding temperatures resulting from the trace welding operation can be in the neighborhood of 10,000° F., a relatively high heat input is applied to the joint. The zinc tends to boil out and leave a rather porous copper, which results in a weak joint. Therefore, back filling the joints with solder to strengthen the bond is often necessary. Even so, when the radiator core is subjected to the thermal, pressure, and mechanical stresses of use in a vehicular engine, leaks and failures can occur at an undesirable rate.

Additionally, the trace welding technique can be tedious and inefficient, one reason being because each oval must be traced one at a time and the welding head must be properly cued up for each oval, one at a time. Depending upon the sophistication of the operator, whether it be manual or computer driven, any lack of uniformity in the shape and size of the ovals can lead to welding head misalignment and less than optimum welded joints. Increased accuracy comes at the cost of reduced speed.

Prior art trace welding machines, because of the required precision and relatively low permissible margin for error, can be quite costly. Even so, such machines often produce welded radiator cores at a relatively slow rate, which cores then may need backfilling, a further cost disadvantage.

U.S. Pat. Nos. 4,425,491; 4,319,113; and 3,675,841 show a variety of apparatus and methods for carrying out welding operations such as for example continuous welding of a series of tubes to a tube sheet.

The art also shows arc welding ferromagnetic workpieces under the control of a magnetic field, which can be used to move the arc. See, e.g., U.S. Pat. No. 4,443,686; 4,246,464; 4,278,868; 4,511,784; and 3,626,145.

III. SUMMARY OF THE PRESENT INVENTION

In accordance with the present invention, a method of welding an array of heat exchanger tube ends to a heat exchanger header is provided, wherein an electric arc welding torch is moved along a row of tube ends in a first direction while a magnetic field applied to the arc causes the arc to oscillate or sweep back and forth in a direction normal to the first direction to produce an effective welding strip width along said row that is wider than the width that would be achieved without the magnetic field.

The sweep welding method of the present invention also uses a.c. current rather than d.c. current as a welding current.

Also in accordance with the present invention, sweep welding apparatus is provided including a welding head, means for scanning said head along a row of tube ends, and a magnetic generator for producing magnetic lines of flux to oscillate a welding arc back and forth in a direction normal to the welding head path of travel.

It is an object of the present invention to provide a sweep welding method and apparatus for welding radiator tube ends to a radiator tube header that avoids the tedious necessity of tracing out each welding joint one at a time.

It is a further object of the present invention to provide a sweep welding method and apparatus for welding an array of tube ends to a tube header wherein the welding head can be moved back and forth in a linear scanning fashion across the tube ends rather than tracing out the joints one at a time.

It is a further object of the present invention to provide a sweep welding method and apparatus for welding an array of tube ends to a tube header wherein improved weld integrity is achieved.

Further objects and advantages of the present invention will become apparent from the following description of the drawings and the preferred embodiments.

V. DETAILED DESCRIPTION OF THE PREFERRED EMBODIMENT

Figure 1:
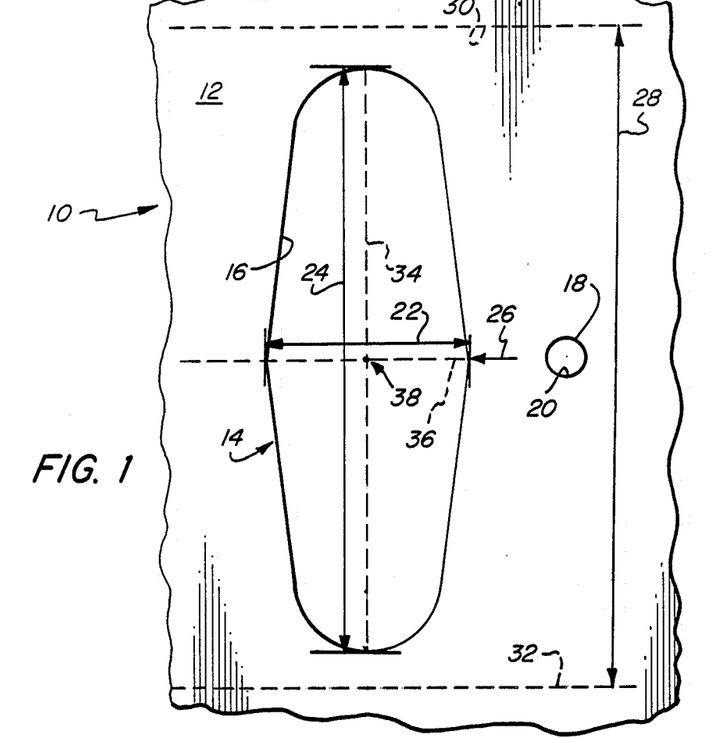
FIG. 1 is a schematic diagram illustrating a top view of the sweep welding method.

In FIG. 1, figure number 10 illustrates a small section of a heat exchanger such as for example a vehicular radiator core having a tube plate 12 such as for example a radiator header with a single tube end 14 protruding therethrough. Line 16 traces out a generally oval shape and corresponds to a welding joint to be welded by a welding arc 18 represented by circle 20, such as for example an electric arc of suitable current and voltage produced by a welding torch not here shown (see FIG. 3 below). Arc 18 will produce a weldment along a portion of joint 16 wherever arc 18 encounters such joint, generally within or in the near region of said circle 20.

In the prior art trace welding method, arc 18 would be positioned by moving the welding torch to position arc 18 at some suitable point along joint 16 and then trace along joint 16 all the way around the oval. The tedious nature of such an undertaking can readily be appreciated, and the opportunity for error is readily apparent here, where tube ends typically are only about 0.200 inches across their shorter diameter indicated at 22, about 0.600 inches across the longer diameter indicated at 24, and can number several hundred for each radiator core.

In the sweep welding method of the present invention, arc 18 moves—not around joint 16—but rather across tube end 14 in a first selected, generally linear direction along a path of travel indicated generally by arrow 26 at a predetermined generally constant velocity, while at the same time arc 18 is swept back and forth in a crossways direction as indicated by double headed arrow 28 in a reciprocating or oscillating motion having an amplitude represented by dotted lines 30 and 32 sufficient to encounter joint 16 across its long diameter 34 and all the way around the perimeter of the oval tube sidewall as arc 18 moves across the short diameter 36 of tube end 14. In other words, a weldment that would otherwise correspond only to those points where the relatively small diameter of circle 20 encounters joint 16 is broadened to include any joint portion lying between lines 30 and 32.

If arc 18 is an electric welding arc, as it is in the preferred embodiment, the voltage and current can be varied in conjunction with controlling the speed of travel along the path corresponding to short diameter 36 and the rate of oscillation back and forth in the direction of arrow 28 to obtain a desired weldment in view of the tube end and header materials used. Other variables that can be adjusted include the left and right dwell times when the arc temporarily pauses in either extreme end point left and right of its oscillation in direction of arrow 28.

FIG. 1 illustrates the preferred method wherein arc 18 travels in a straight line along short diameter 36 of tube end 14 through tube central axis 38 about which the tube is formed, while arc 18 is simultaneously oscillated in directions 28 perpendicular to direction 26. However, the sweep welding method can be accomplished in other variations that are within the scope of the present invention. For example, arc 18 can also be moved in a first direction other than a straight line while being reciprocated in a generally crossways direction, which need not be perpendicular to said first direction but only has a component normal to said first direction. Or by way of further example, arc 18 can also follow a path of travel that passes through said tube end other than at the center 38. In fact, the path of travel need not even pass through tube end 14 if the crossways motion has an amplitude sufficient to encounter the joint 16. Also, if the amplitude of reciprocation is not sufficient for the arc 18 to encounter all of the joint 16 as arc 18 passes across the short diameter 22, then arc 18 may have to make more than one pass either by or through the tube end 14. Also, arc 18 need not be reciprocated symmetrically about the torch's path of travel, but rather could be oscillated back and forth only on one side.

Figure 2:
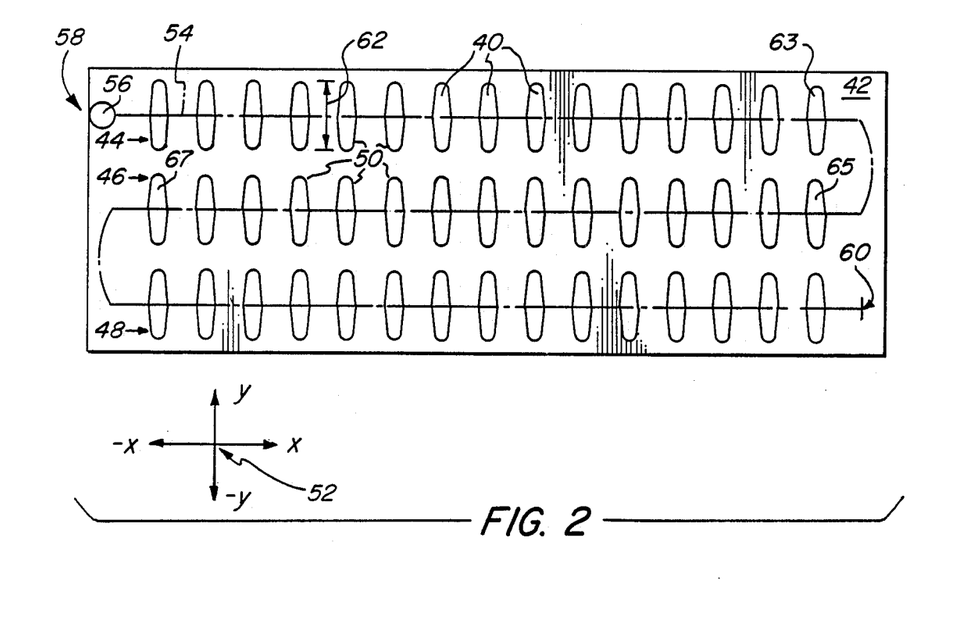
FIG. 2 is a schematic diagram illustrating the sweep welding method for an array of tubes such as is typically found in a vehicular radiator core.

FIG. 2 illustrates a plurality of tube ends 40 as would be found in a section of radiator header 42. Tube ends 40 are arranged in a rectangular array of three parallel, usually straight rows 44, 46, and 48 of tube ends 40 in a plane corresponding to header 42, wherein each oval such as at 50 indicates a joint to be welded. For ease of description, header 42 and rows 44, 46, and 48 are aligned with an x-y frame of reference indicated at 52. Dotted line 54 indicates the path of travel followed by welding arc 56 at a predetermined constant velocity from starting or home position 58 to stopping or end position 60.

Arc 56 moves at a selected velocity or rate of travel in the +x direction along row 44 while simultaneously being swept back and forth in first the +y and then the −y direction a sufficient amplitude 62 to encounter each joint 50 all the way around its perimeter. Once the arc is struck at home position 58, it is not extinguished until end point 60, but rather moves continuously along row 44 while being swept back and forth in a crossways direction until the last tube end 63 is completed. Then arc 56 indexes in the −y direction to row 46 and begins with tube end 65 and, travelling in the −x direction, finishes row 46 with tube 67, and so on in a scanning fashion. Row 48 in the +x direction completes the scan at end position 60.

It is understood that if the amplitude of crossways reciprocation is too small for the tube size, then several passes may be made per row. Also, the sweep welding technique is not limited to a rectangular array, but can also be used with any array or even an irregular arrangement of tube ends. The sweep welding technique in effect generates a welding swath of a width on either side of the path determined by the amplitude of reciprocation, and the path can simply be chosen so that every necessary point on the header is at some point in time included within the swath.

Figure 3:
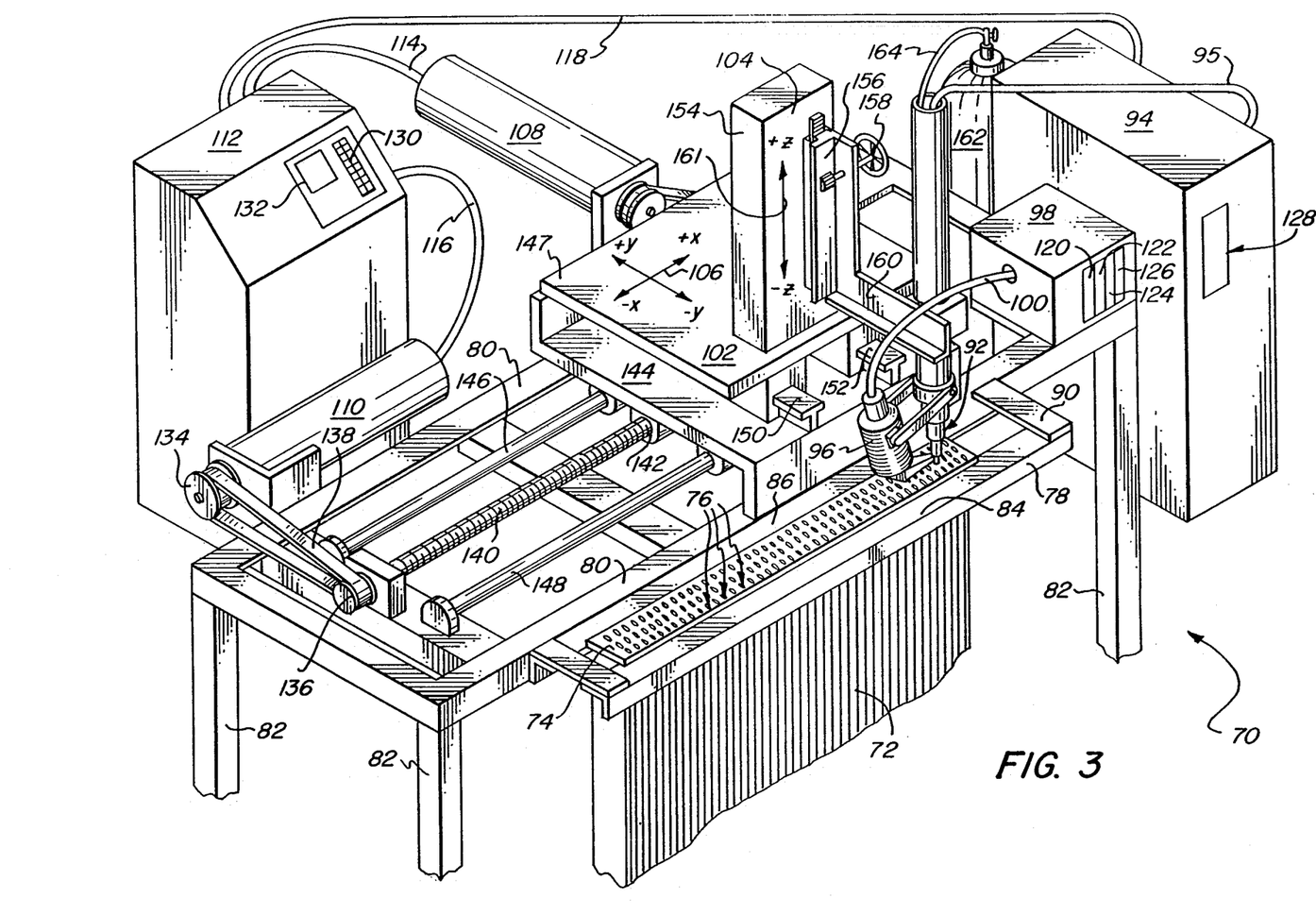
FIG. 3 is an isometric view of one preferred embodiment for carrying out sweep welding.

FIG. 3 indicates generally at 70 the preferred embodiment of the sweep welding apparatus for carrying out the sweep welding method of the present invention. Radiator core 72 having a tube plate such as header 74 and tube ends such as 76 protruding therethrough in a rectangular array of three parallel rows is mounted in a jig structure 78 on supporting frame 80 for mounting on a support surface such as a floor. Legs 82 have a height sufficient to permit radiator core 72 to be so mounted in jig 78, which includes parallel longitudinal members 84 and 86 suitably spaced by cross members 88 and 90 for supporting core 72. A conventional electric arc welding torch head 92 driven by a conventional welding power supply 94 through cable 95 and an electromagnetic probe 96 driven by a conventional magnetic arc controller 98 through cable 100 are mounted on a conventional x-y table 102 through suitable bracketry and linkage indicated generally at 104. The x-y table 102 provides means for moving torch head 92 in a scanning pattern about an x-y frame of reference indicated at 106 by servo-controlled motors 108 and 110 responsive to a conventional programmable logic controller (PLC) 112 through cables 114 and 116 respectively. PLC 112 also can control power supply 94 between "on" and "off" positions via cable 118.

In the preferred embodiment by way of example only, magnetic arc controller 98 provides means for reciprocating said arc by producing magnetic flux and is a Cyclomatic Model 80A sold by Cyclomatic Industries Inc. of San Diego, California, and has adjustable control features including thumb wheel switches 120, 122, 124, and 126 for amplitude, left dwell, speed, and right dwell as further described below. Controller 98 provides a magnetic field capable of oscillating and positioning a welding arc. It is understood that other suitable arc control methods could be used as well.

Conventional power supply 94 in the preferred embodiment is a means for generating an electric welding current and by way of example only is a Syncrowave 250 manufactured by Miller of Appleton, Wisconsin and is capable of providing an a.c. (alternating current) welding current in the range of 0 to 250 amperes at a voltage of 0 to 70 volts peak to peak. Among other routine control features, supply 94 has a selector switch means 128 for adjusting the magnitude of current flow supplied to head 92. It is of course understood that other conventional power supplies could be used as well.

PLC 112 provides means for controlling the x-y table to move torch head 92 in a preselected scanning pattern and is a conventional Fagor Model 820 Model GP manufactured by Fagor Co. of Elk Grove Valley, Illinois and includes a conventional keyboard 130 with accompanying CRT screen 132 for operator selection of operation modes from a menu displayed on screen 132. PLC 112 through servo-controlled motors 108 and 110 controls the displacement of head 92 by scanning head 92 along the rows of tube ends along a predetermined and programmed path of travel such as that shown at 54 in FIG. 2. Displacement as well as torch head velocity is readily controllable in a conventional manner by programming PLC 112 in a routine fashion. PLC 112 can be programmed with one set of x-y coordinates and torch head velocity profiles for each radiator core to be welded. The operator informs PLC 112 of which core is in jig 78 through keyboard 130 by following user-friendly instructions displayed on screen 132. Other conventional programmable controllers could of course be used as well.

Motor 110 through pulley pair 134, 136 and belt linkage 138 rotates screw 140, which acts on matching slide 142 for moving lower table 144 back and forth in the x-direction on slide rod pair 146, 148. Upper table 147 with motor 108 and corresponding linkages (not shown) provide motion in the y-direction along members 150 and 152. Operation of such a conventional x-y table is well known and need not be elaborated upon here.

Vertical upright member 154 supports a conventional elevator assembly such as for example rack and pinion arrangement 156 operated by hand wheel 158 and coupled to bracket 160 for raising and lowering torch 92 in the z-direction indicated at 161 to adjust the welding gap between the electrode and tube-header combination at the point of welding. The gap typically is about ⅜ inches.

Conventional gas tank assembly 162 through line 164 provides a TIG environment for the welding operation as is well known in the art.

Figure 4:
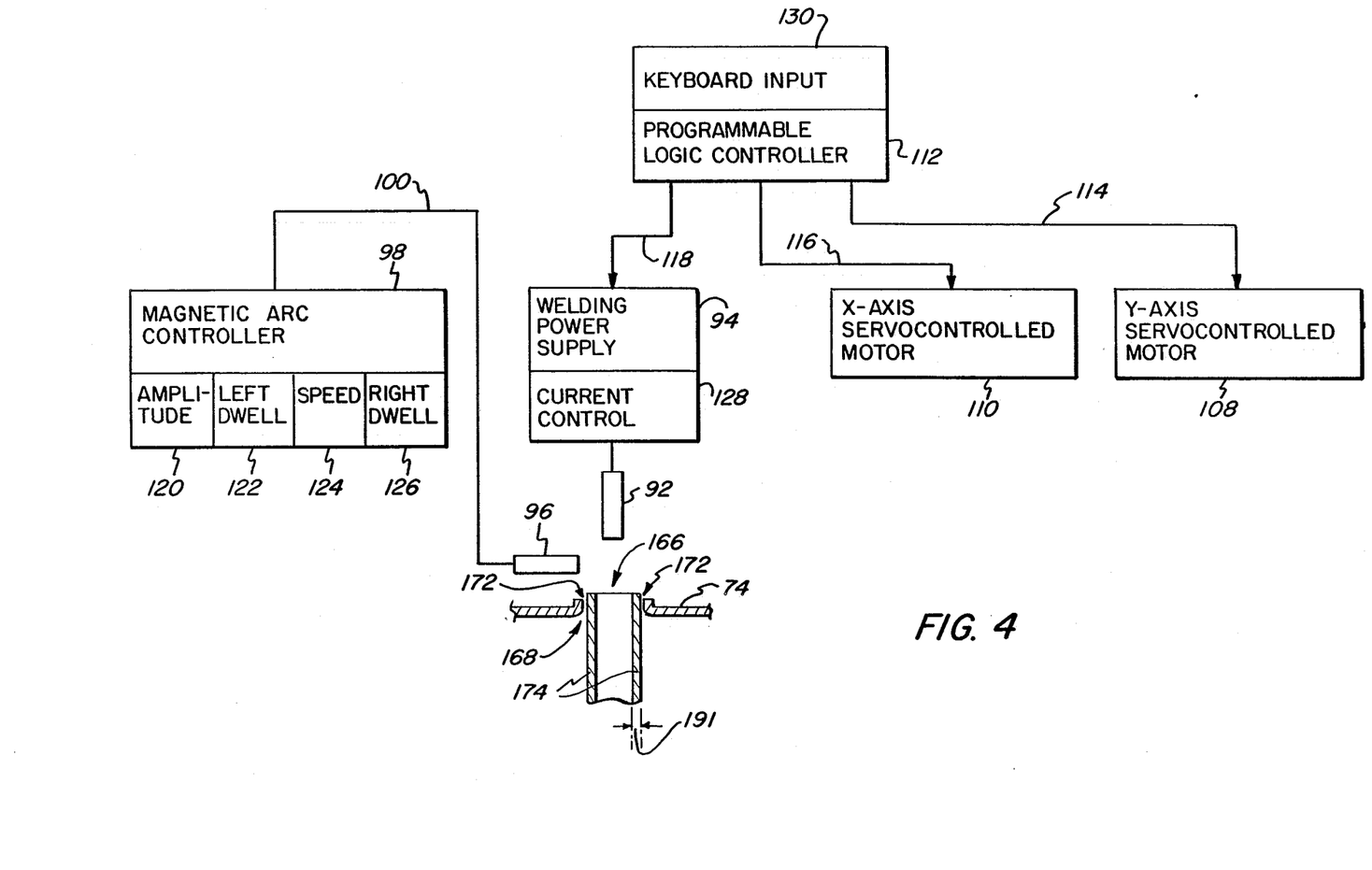
FIG. 4 is a block diagram of the sweep welding apparatus of the present invention.

FIG. 4 is a block diagram further illustrating the sweep welding apparatus of FIG. 3. Like figure numbers correspond to like structure. In FIG. 4, torch 92 and magnetic probe 96 are shown positioned next to a representative tube end 166 protruded through an aperture or ferrile 168 formed in header 74 to form a welding joint 172 circumferentially around tube sidewall 174.

Figure 5:
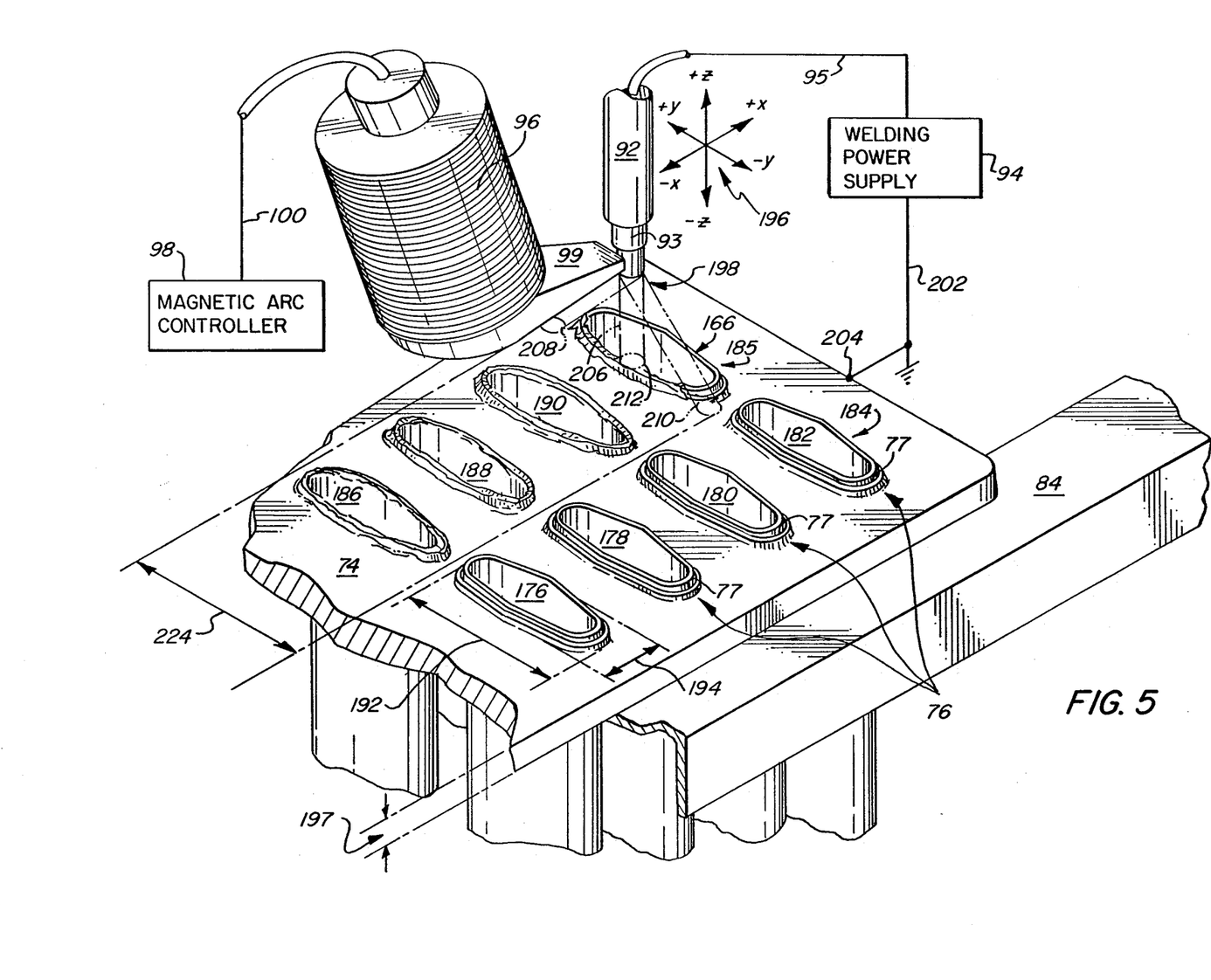
FIG. 5 is a more detailed view of one aspect of the sweep welding apparatus of FIG. 3.

With reference now to FIG. 5, header 74 with a plurality of tube ends indicated generally at 76 protrude through ferriles such as at 77 in header 74. Tube ends 176, 178, 180, and 182 in row 184 have not as yet been welded, whereas tube ends 186, 188, and 190 have been so welded to form weldments all the way around each tube perimeter. Tube end 166 is in the process of being welded and is shown in more detail in the side and top views respectively of FIGS. 6 and 7 described below.

In the typical radiator core, both the tubes and the headers are formed from cartridge brass, which is substantially about 70% copper and 30% zinc, although the sweep welding process of the present invention can also be used for other suitable materials such as for example red brass (substantially about 85% copper and 15% zinc) or aluminum. The tubes typically have a sidewall thickness 191 (see FIG. 4) in the range of substantially about 0.007 to 0.009 inches, a long outer diameter 192 about 0.580 to 0.620 inches, and a short outer diameter 194 in the range of substantially about 0.200 inches. Tubes need not be oval, but could be other shapes as well. The header 74 is formed from a plate member having a thickness 197 approximately in the range of substantially about 0.030 to 0.064 inches. Only two rows 184 and 185 of tube ends are shown in FIG. 5 although it is understood that the rows can extend further in all directions in the x-y plane as defined by the frame of reference 196.

Welding torch head 92 includes a conventional electrode 93 separated from the tube and header workpiece by a welding gap 198. Power supply 94 provides an electric arc welding potential across gap 198, with line 202 or ground being connected electrically at 204 to header 74 and line 95 being connected electrically to electrode 93.

A magnetic flux generator such as magnetic oscillator or arc controller 98 includes a magnetic probe 99 for producing a magnetic field in the region of electrode 93 in FIG. 5. By varying the strength or magnetic flux line density through conventional suitable control circuitry in controller 98, electric welding arc depicted as a cylindrical beam at 206 can be made to oscillate back and forth in a crossways direction between the extreme end positions left and right indicated by dotted lines 208 and 210 to cover the welding joint therebetween. For clarity of illustration, the configurations of the magnetic flux lines are not shown, as it is well known in the art to use magnetic flux to control a welding arc.

Figure 6:
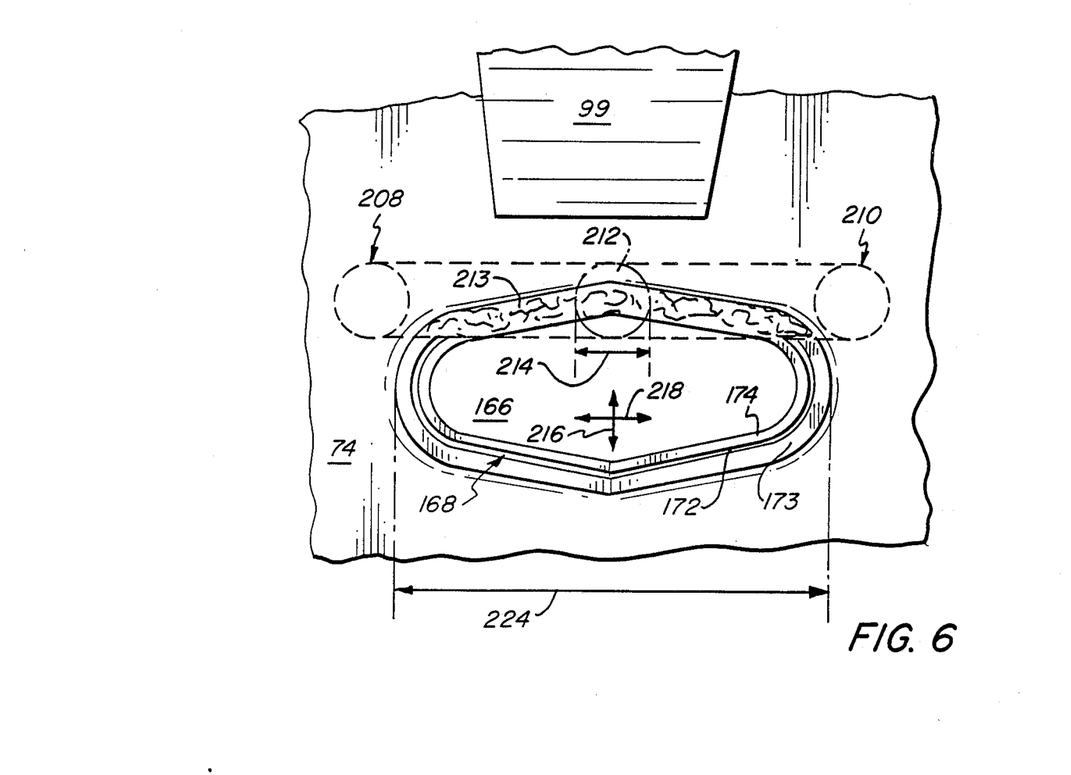
FIG. 6 is a top view of a tube end being sweep welded to a header.
Figure 7:
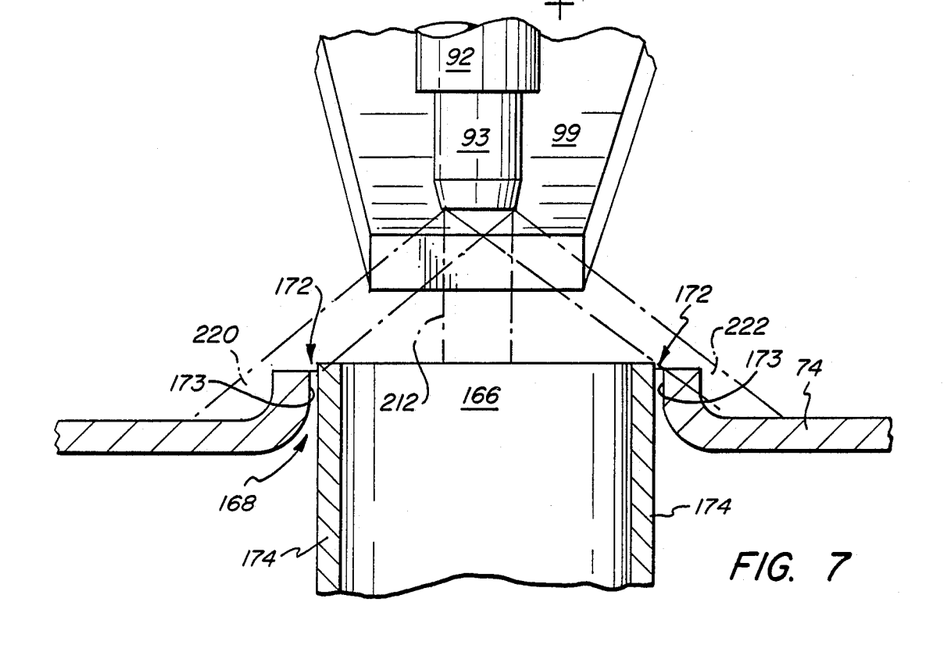
FIG. 7 is a side view of FIG. 5.

FIG. 6 shows tube end 166 and the surrounding header region from a top perspective, while FIG. 7 is a side view. Header 74 has a generally oval aperture or ferrile 168 formed therein. Tube end 166 is extended therethrough and tubular sidewall 174 forms a welding joint 172 with an edge portion 173 of header 74 where header 74 is punched upwardly. It is understood that depending upon the precise orientation of tube end 166, the sidewalls 174 will probably touch edge 173 at a number of points.

The active welding area of arc 206 is depicted as circle 212, the diameter of which is indicated at 214. It is understood that the actual welding arc may not have such a configuration, but rather is used here for ease of description. If the welding head 92 were simply moved in the direction as indicated by arrow 216, the width of the weldment created would be only about diameter 214. However, by activating probe 99 to simultaneously cause arc 206 to reciprocate or oscillate back and forth in the y-directions in a sweeping motion as indicated by arrow 218, between extreme outer positions indicated at 208 and 210 in a cross direction, a wider weldment 213 and welding strip having a width indicated generally at 224 can be produced. As the welding head 92 is then simultaneously moved in the x-direction, a broadened welding path is produced. Therefore a whole row width of tube ends as shown in FIG. 2 can be welded by one trip of welding head 92.

Amplitude control 120 of controller 98 can be used to vary the density of the magnetic flux; speed control 124 adjusts the rate at which the arc oscillates or sweeps crossways; and right and left dwell controls 126 and 122 adjust the dwell or pause time at the right and left extreme most points 222 and 220 respectively.

Accordingly, the width 224 of the welding path created by the welding head 92 can be readily adjusted. For example, a welding path 224 could be reduced to half width, with two trips being necessary per row. It is also possible if desired to adjust the trips to provide for an overlap in the welding paths.

The manner in which PLC 112 can be programmed to cause x-y table 102 to produce different scan patterns is well known in the art. Accordingly, different tube end arrays can be readily accommodated to the displacement pattern. The velocity at which the welding head moves along the path of travel can likewise be programmed with PLC 112.

The correct welding current from power supply 94 is selected by adjusting control 128.

The sweep welding of different radiator cores of different sizes and materials requires different operational parameters. It has been found that for headers and tube ends made of cartridge brass (substantially about 70% copper and 30% zinc) in the range of header thicknesses of substantially about 0.030 to 0.050 inches and tube sidewall thicknesses in the range of substantially about 0.007 to 0.009 inches, the velocity of welding head travel is in the range of 90 to 120 inches per minute and the welding current is in the range of 150 to 160 amperes at a voltage of about 33 volts peak to peak with a welding gap of about ⅜ inches. The side to side oscillation rate and dwell time are adjusted to give a suitable weld along a weld path of selected width.

For aluminum tubes and headers where the header is substantially about 0.060 inches thick and the tubes have a sidewall thickness of substantially about 0.009 inches, the welding current is about 75 to 80 amperes at a voltage of 18 to 20 volts peak to peak and a welding head velocity of about 90 inches per minute.

It has been found that vehicular radiator cores formed by the sweep welding method and apparatus of the present invention can be produced more efficiently and quickly than by the prior art trace welding method; that sweep welded cores have improved thermal and pressure test results; that the metallographic integrity of the sweep welds produced thereby is improved; and that the need to back fill on the air side with solder is reduced for sweep welded cores.

For example, in a typical durability testing procedure, two sweep welded radiator cores without air side solder were subjected to thermal tests and cycled between 55 and 195 degrees Fahrenheit at a rate of 40 cycles per hour. Both cores had endured 4,490 cycles with no leaks when the test was finally stopped. Typical industry specifications are merely 3,000 cycles without leaks. Also, a prior art trace welded core would generally be backfilled to reach such thermal durability.

In a pressure cycle test, two sweep welded cores were cycled between 0 and 18 p.s.i. at a temperature of 250° F. at a rate of 7 cycles per minute. One core developed a thermal leak after 63,942 cycles, while the other core lasted 101,165 cycles without a leak, whereupon the test was stopped. Typical pressure test results for sweep welded cores are in the range of 80,000-90,000 cycles without leaks. By comparison, industry standards require only 25,000 cycles without a leak.

It should be understood that the sweep welding process of the present invention can be carried out with a metal inert gas (MIG) as well as TIG process. Also, while the preferred embodiment uses a magnetic arc control for side to side reciprocation, other means such as for example mechanical means could be used for the side to side sweeping. If mechanical means were used, an acetylene welding procedure could also be employed.

It is further understood that terms like "up", "down", "left", "right", "forward", and "backward" are used to show relative positions only and are not intended to be limiting of the present invention.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. Method of welding a tube to a tube plate wherein a tube end formed by a tube end sidewall protrudes through an aperture in said plate to provide a joint for welding said sidewall to said plate in the region of said aperture, said method comprising the steps of:
    (a) moving a welding head, and thus its welding arc, in a selected direction along a path of travel to form a weldment along said joint where said welding arc encounters said joint; and
    (b) simultaneously with step (a), reciprocating said welding arc back and forth in a crossways direction relative to said selected direction of movement of said welding head, and independent of movement of said welding head, with an amplitude of reciprocation sufficient to encounter at least a portion of said joint lying to at least one side of said path to further form a weldment along said joint portion as said arc moves in said selected direction;
whereby welding of at least a part of said joint can be accomplished to the side of said path as well as along said path.

2. The method of claim 1, wherein said amplitude of reciprocation is sufficient for said arc to encounter said joint to weld said joint all the way around said tube end.

3. The method of claim 1, wherein said tube is formed along a central tube axis, and said path is generally aligned to pass across said tube end adjacent said central axis, and said arc is reciprocated on either side of said path by an amplitude sufficient to weld said joint all the way around said tube end.

4. The method of claim 1, wherein a plurality of tubes having tube ends protruding through said plate are to be welded to said plate, and said path is chosen to permit said arc to encounter said tube ends one after the other.

5. The method of claim 4, wherein said plurality of tubes are formed in a patterned array, and said path is chosen to correspond to said array to permit said arc to encounter said tube ends in seriatim.

6. The method of claim 5, wherein said tube ends are arranged in a rectangular array of a plurality of rows of tube ends, and said path is chosen to move said arc along first one row and then another in seriatim, said amplitude being sufficient to weld each tube end to said plate all the way around each joint.

7. The method of any one of claims 1 to 6, wherein both said tube ends and said tube plate are formed of brass.

8. The method of any one of claims 1 to 6, wherein both said tube ends and said tube plate are formed of aluminum.

9. The method of claim 3, wherein both said tube end and said tube plate are formed of brass having substantially about 70% copper and 30% zinc and said tube sidewall has a thickness in the range of substantially about 0.007 inches to 0.009 inches, and said header has a thickness in the range of substantially about said 0.030 inches to 0.064 inches, and said arc is moved along said path at a velocity substantially in the range of 95 to 120 inches per minute.

10. The method of claim 9, wherein said arc is an a.c. electric arc having an electric current of substantially about 150 amperes.

11. The method of claim 1, wherein said reciprocating step comprises applying a varying magnetic field to said arc.

12. A vehicular radiator welded in accordance with the method of claim 1.

13. Apparatus for welding a tube to a tube plate wherein a tube end formed by a tube end sidewall protrudes through an aperture in said plate to provide a joint for welding said sidewall to said plate in the region of said aperture, said apparatus comprising:
(a) means for moving a welding head, and thus its welding arc, in a selected direction along a path of travel to form a weldment along said joint where said welding arc encounters said joint; and
(b) means for reciprocating said welding arc back and forth in a crossways direction relative to said selected direction of movement of said welding head, and independent of movement of said welding head, while said welding head and welding arc are being moved in said selected direction, with an amplitude of reciprocation sufficient to encounter at least a portion of said joint lying to at least one side of said path as said arc moves in said selected direction to further form a weldment along said portion,
whereby welding of said joint can be accomplished to the side of said path as well as along said path.

14. The apparatus of claim 13, wherein a plurality of tubes having tube ends protruding through said tube plate are to be welded to said plate, and said moving means is further for moving said arc to encounter said tube ends one after the other.

15. The apparatus of claim 14, wherein said plurality of tubes are formed in an array, and said apparatus further includes means for controlling said moving means to move said arc in a path corresponding to said array to encounter said tube ends.

16. The apparatus of claim 15, wherein said tube ends are arrayed in a rectangular array of a plurality of rows of tube ends, said moving means includes a servocontrolled x-y table, and said controlling means includes a programmable logic controller, and said path is determined under control of the programmable logic controller to move said arc along said rows in seriatim, said amplitude being sufficient to weld each tube end to said plate all the way around its joint.

17. The apparatus of claim 13, wherein said reciprocating means comprises magnetic flux generator means for applying a varying magnetic field to said arc.

18. The apparatus of claim 17, wherein said arc is an electric arc and said magnetic generator means is a magnetic arc controller.

19. Method of electric arc welding a row of heat exchanger tubes to a header, said row including a plurality of tube ends engaged in apertures in said header to provide a tube end joint for welding to said header, said method comprising the steps of:
(a) moving an electric arc welding torch along a path of travel encountering said tube ends in seriatim from a beginning position to an end position for said row while causing an electric current to flow between said torch and said row to form a welding arc sufficient to weld said joints, said arc encountering at least portions of said joints along said path of travel to weld said tube ends to said header along a welding strip width about said path of travel; and
(b) simultaneously with said moving of step (a), applying a varying magnetic field in the region of said arc to reciprocate said welding arc substantially crossways to said path of travel of said welding torch, and independent of moving of said welding torch, to widen said welding strip width.

20. The method of claim 19, wherein said electric current is an alternating current.

21. The method of claim 19, wherein both said row and said path lie along a relatively straight line.

22. The method of claim 19, further including a plurality of generally parallel rows comprising an array, and said welding torch is moved in succession along a series of paths generally parallel to each other.

23. The method of claim 22, wherein each said path has a portion that is a substantially straight line.

24. The method of claim 22 wherein said array comprises at least one row of tube ends, said row being generally alignable with an x-direction in an x-y plane, said row having a row width in a y-direction, and said method includes the additional steps of:
(a) moving said welding torch along a chosen path of travel in the x-direction beginning with a first selected tube end in said row and ending with a last selected tube in said row, said magnetic field having a flux density chosen to produce a welding strip width that extends over a portion of said row width;
(b) after encountering said last selected tube, indexing said welding torch in the y-direction by a selected distance;
(c) after said indexing step, moving said welding torch along a next path of travel substantially parallel to the first said path but offset in the y-direction by said predetermined distance to further weld said joints in a next welding strip offset in the y-direction by said selected distance; and
(d) continuing to so move the welding torch in the x-direction over said tube ends with indexing of said welding torch further in the y-direction after successive trips,
whereby said joints are welded across said row width.

25. The method of claim 24, wherein said welding torch is moved in the opposite direction after each indexing step to move said torch in a back and forth motion over said tube ends.

26. The method of claim 24, wherein said welding strip associated with a first pass overlaps with a welding strip associated with a next subsequent pass in the opposite direction.

27. The method of claim 24, wherein the width of said welding strip is controlled by application of said magnetic field relative to the row width of said tube ends to weld said joints of said row in one back and forth sweeping cycle.

28. The method of either claim 25 or 26, wherein said array further comprises a plurality of parallel rows of tube ends arranged in columns, said rows alignable to extend along the x-direction with said columns in the y-direction, and said method includes the additional steps of:
 (a) indexing said welding torch to the next subsequent row in the y-direction after a preceding row has been welded;
 (b) subjecting said subsequent row to said back and forth motion; and
 (c) continuing steps (a) and (b) until said rows and columns of tube ends are welded.

29. A vehicular radiator welded in accordance with the method of claim 19.

30. Apparatus for arc welding a tube array including a plurality of tube ends having tubular sidewalls positioned in apertures in a tube plate to form a welding joint therebetween, said apparatus comprising:
 (a) an electric arc welding head positionable to a home position with respect to said array:
 (b) means for generating an electric potential between said head and said array to produce a welding arc therebetween;
 (c) means for displacing said welding head along a route starting with said home position, said route being chosen to pass across said tube ends one after the other, portions of said joints laying within a welding path having a welding path width being welded as said welding arc moves therepast; and
 (d) means for producing magnetic flux having a flux component substantially perpendicular to said arc to control said welding path width produced as said head moves along said route.

31. The apparatus of claim 30, wherein said tube ends are positionable in a plane and said displacing means further includes means for scanning said welding head back and forth over said plane to weld said tube ends to said tube plate.

32. The apparatus of claim 31, wherein said plane corresponds to an x-y plane, and said scanning means includes means for controlling said welding head to begin at a home position, move in the +x direction, index a selected distance in either the +y or −y direction, and then move in the −x direction to weld at least one row of tube ends in said plane.

33. Apparatus for arc welding a heat exchanger tube ends to a header, said tubes having tubular sidewalls as defined by tubular perimeters and said tube ends positioned in apertures in said header to form joints around said perimeters at said apertures for welding therebetween, said apparatus comprising:
 (a) at least one electric arc welding electrode positionable to a beginning position with respect to said header and spaced therefrom by a welding gap;
 (b) electrical means for generating an a.c. electric potential between said electrode and said header to produce an electric arc therebetween at said gap;
 (c) magnetic means for generating a magnetic field in the region of said electric arc;
 (d) means for scanning said electrode along a path having a generally straight path portion across said header such that said path portion encounters at least selected ones of said heat exchanger tube ends; and
 (e) means for controlling said magnetic generating means to oscillate said arc transversely about said straight path portion as said electrode is scanned along said path portion,
whereby said selected ones of said heat exchanger tubes are welded to said header around their respective perimeters.

34. Apparatus of claim 33, wherein said controlling means is further for controlling said scanning means to scan said electrode across said header in a series of parallel path portions separated in a transverse direction by a distance greater than an effective welding swath of said electrode, and said arc is oscillated in said transverse direction to broaden said swath to weld said joints between said parallel path portions.

35. Apparatus of claim 34, wherein said controlling means is further for controlling said scanning means to scan said electrode in a first direction along a parallel path portion, and then in a reverse direction along an adjacent parallel path portion while oscillating said arc in said transverse direction.

36. Apparatus of claim 35, wherein said electrode is scanned along said path portions at a velocity substantially in the range of 90 to 120 inches per minute.

37. The apparatus of claim 36, wherein tubes of said tube array are formed of brass and said header is formed of brass, and said arc comprises an electric current of approximately 150 to 160 amperes.

38. The apparatus of claim 37, wherein said tube sidewalls in the vicinity of said tube ends have a thickness of substantially about 0.0007 inches to 0.009 inches and said header has a thickness of substantially about 0.030 inches to 0.050 inches, and the velocity of said electrode along said path is substantially about 90 to 120 inches per minute.

39. The apparatus of claim 36, wherein said tubes and header are formed of aluminum.

40. Method for welding at least one heat exchanger tube to a header in a vehicular radiator with an electric arc welding electrode positioned adjacent but spaced from said tube and header, said tube having a tube end with a tubular sidewall defined by a tubular perimeter, said tube ends positioned in an aperture in said header to form a joint therebetween around said perimeter for arc welding, said method comprising the steps of:
 (a) moving said electrode back and forth in a scanning pattern including a series of generally parallel scans spaced one from the other by a selected distance;
 (b) simultaneously with said moving step, continuously applying an electric arc welding potential between said electrode and said tube and header to produce a welding arc therebetween while at the same time continuously applying a magnetic field to said arc to deflect said arc back and forth in a direction having a component generally normal to said path,
whereby an effective welding area of said arc is broadened as said arc is moved back and forth to weld said tube ends around said perimeters to said header.

41. The method of claim 40, wherein said magnetic field is time varying.

42. The method of claim 41, wherein said electrode is moved at a velocity of substantially about 90 to 120 inches per minute, said tubes having a thickness in the range of substantially 0.007 to 0.009 inches, and said header has a thickness in the range of substantially 0.030 inches to 0.050 inches.

43. The method of claim 40, wherein said potential is an a.c. potential.

44. The method of claim 43, wherein said tube end has an oval cross section, said oval having a longer and a shorter outside diameter, and there being a plurality of tubes arranged in a rectangular array of 3 rows, each row having a width corresponding generally to the longer outside diameter of said oval, and said moving step includes the step of moving said electrode along a selected one of said rows from a first selected tube end in said row past a last selected tube end in said row in a direction corresponding to the shorter outer diameter of said tube ends, and said arc is moved back and forth a sufficient distance to cover said longer diameter and weld each said tube end to said header around said perimeter during one pass of said electrode past said tube end.

45. The method of claim 44, wherein said electrode is indexed to a next subsequent row after said last selected tube end has been welded, and said next subsequent row of tube ends is welded around their perimeters in the next pass of the electrode along said row.

46. A vehicular radiator welded in accordance with the method of claim 40.

* * * * *